(12) United States Patent
Liang

(10) Patent No.: US 6,201,714 B1
(45) Date of Patent: Mar. 13, 2001

(54) EXCHANGING CONVERTER HAVING A ZERO-VOLTAGE SWITCHING CONTROL CIRCUIT FOR DRIVING AN OUTPUT VOLTAGE FILTER CAPACITOR TO PARTIALLY FEED BACK STORAGE ENERGY TO AN INPUT SIDE OF THE TRANSFORMER OR STORAGE INDUCTOR

(75) Inventor: Jim H. Liang, Taipei (TW)

(73) Assignee: Skynet Electronics Co., Ltd., Taipei (TW)

( * ) Notice: Subject to any disclaimer, the term of this patent is extended or adjusted under 35 U.S.C. 154(b) by 0 days.

(21) Appl. No.: 09/505,851

(22) Filed: Feb. 17, 2000

(30) Foreign Application Priority Data

Nov. 9, 1999 (TW) ................................................ 88119597

(51) Int. Cl.[7] ................................................ H02M 3/335
(52) U.S. Cl. ................................ 363/21; 363/95; 323/268
(58) Field of Search .................................. 363/20, 21, 95, 363/97; 323/222, 268, 282

(56) References Cited

U.S. PATENT DOCUMENTS

| | | | |
|---|---|---|---|
| 5,325,283 | * | 6/1994 | Farrington et al. ..................... 363/21 |
| 5,434,768 | * | 7/1995 | Jitaru et al. ............................. 363/21 |
| 5,619,403 | * | 4/1997 | Ishikawa et al. ....................... 363/21 |
| 5,986,911 | * | 11/1999 | Tang ...................................... 363/89 |
| 6,058,026 | * | 5/2000 | Rozman ................................. 363/16 |

* cited by examiner

Primary Examiner—Adolf Deneke Berhane
(74) Attorney, Agent, or Firm—Bacon & Thomas, PLLC

(57) ABSTRACT

An exchanging converter includes a zero-voltage switching control circuit, which drives an output voltage filter capacitor to partially feed back storage energy to an input side thereof by means of the operation of a transformer (or storage inductor), and provides a complementary driving signal to switches in the exchanging converter when the switches reaching a zero-voltage switching control condition, so as to control turn off or turn-on time of the switches, enabling the switches to repeat the switching operation at zero-voltage again and again.

12 Claims, 9 Drawing Sheets

EXCHANGING CONVERTER HAVING A ZERO-VOLTAGE SWITCHING CONTROL CIRCUIT FOR DRIVING AN OUTPUT VOLTAGE FILTER CAPACITOR TO PARTIALLY FEED BACK STORAGE ENERGY TO AN INPUT SIDE OF THE TRANSFORMER OR STORAGE INDUCTOR

BACKGROUND OF THE INVENTION

1. Field of the Invention

The present invention relates to an exchanging converter with a zero potential switching control function, and more particularly to such a converter, which drives every switch to achieve a switching operation at a zero-voltage status, so as to effectively eliminate power loss due to a high frequency switching operation.

2. Description of the Prior Art

In recent years, semiconductor fabrication technology has rapidly developed, and semiconductor elements are made more and more smaller. This development trend in semiconductor fabrication drives electronic product manufacturers to create and design thinner, lighter and shorter products. However, in conventional hard type exchanging converters, a power switch is operated under a high frequency environment. This operation consumes much power, and produces much heat. In order to prevent damage due to heat, a heat sink, fan, and suitable cooling means must be installed to carry heat from the converter. Further, these conventional hard type-switching converters are expensive, and wear quickly with use. Because of the aforesaid numerous drawbacks, conventional hard type switching converters cannot be made as small as desired.

Since 1980, following the development of microcomputer, "small-size" has become more and more important in the fabrication of electronic products. In order to meet this requirement, the following converters are developed:

(1) Flyback Converter

A flyback converter, as shown in FIG. 1, comprises an input voltage filter capacitor $C_1$ connected between two opposite ends of an input power source $V_{in}$ to provide a stable input voltage to a posterior converter. The posterior converter comprises a transformer. The transformer comprises a primary winding $L_p$ and a secondary winding $L_s$. The primary winding $L_p$ is connected to a switching element $S_1$, forming a series loop at two opposite sides of the filter capacitor $C_1$. The secondary winding $L_s$ is connected to a diode $D_1$, forming a series loop at two opposite sides of a filter capacitor $C_2$. Modulated high frequency from the switching element $S_1$ is smoothed through the posterior converter, so that the transformer provides a DC output voltage $V_o$ to the load. In this flyback converter, when the switching element $S_1$ is on, input power source $V_{in}$ charges the primary winding $L_p$, enabling energy to be stored therein. At this time, the polarity of the primary winding $L_p$ is reversed to the secondary winding $L_s$, and the diode $D_1$ is biased reversely, and therefore the output voltage filter capacitor $C_2$ provides the load with the necessary energy. When the switching element $S_1$ is off, the magnetic flux at the transformer starts to contract, and the voltage polarity of the second winding $L_s$ is reversed to produce an induced current, thereby causing the diode $D_1$ to be electrically connected. When the diode $D_1$ is electrically connected, it charges the filter capacitor $C_2$, enabling electricity to be outputted to the load. Because a high voltage exists in the switching element $S_1$ when the switching element $S_1$ is off, a potential energy ($CV^2/2$) is accumulated in its parasitic capacitance. This potential energy ($CV^2/2$) is changed into heat energy at the moment the switching element $S_1$ is switched off. Therefore, the switching element produces high heat under a high frequency switching environment, and wears quickly with use. U.S. Pat. No. 5,057,986 discloses a converter, which eliminates the aforesaid problem. According to this design, as shown in FIG. 2, another switching element $S_2$ and capacitor $C_p$ are added to the primary circuit, so that the resonance formed at the parasitic capacitance of the inductance Lp, capacitor $C_p$ and switching elements $S_1;S_2$ of the converter is utilized to achieve a zero-voltage control scheme. However, because this zero-voltage control scheme provides the necessary energy for zero-voltage control by means of the inductor Lp, zero-voltage control becomes more difficult to achieve when the load is high. U.S. Pat. No. 5,402,329 discloses another design, in which, as shown in FIG. 3, a small inductance $L_1$ is installed in the converter to provide the necessary energy for zero-voltage control. This inductance can be an externally added inductance, or a leakage inductance of the transformer itself. This design eliminates the drawback of the disclosure of U.S. Pat. No. 5,057,986, however because the zero-voltage control of this design relies on the stray capacitance and leakage inductance of the circuit, which is difficult to specify when designing and fabricating this structure of converter.

(2) Boost Converter

A boost converter, as shown in FIG. 4, is used to improve power factor correction. Because power factor correction runs under a high voltage environment, a voltage of about 400V exists when the switching element $S_1$ is switched off, and accumulated high electric energy will be changed into heat energy at the switching element $S_1$ at the moment the switching element $S_1$ is switched on, causing the service life of the switching element $S_1$ to be shortened. In 1992 Lee Yuan-Tse et al disclosed another design of converter, in which, as shown in FIG. 5, an auxiliary switch $S_2$, an inductor $L_2$ and a diode $D_2$ are added to the circuit shown in FIG. 4. When operated, the auxiliary switch $S_2$ is transiently turned on and maintained electrically connected until the voltage at the switching element $S_1$ is discharged, and the switching element $S_1$ is turned on to complete zero-voltage switching control when reached the status of zero-voltage is reached. This design greatly increases the cost. Because of high cost, this design is not popularly accepted. FIG. 6 shows another design according to U.S. Pat. No. 5,402,329. This design simply reduces discharge loss at the switching element $S_1$ due to deposit charge at the rectifier diode $D_1$. However, because the switching element $S_1$ uses a hard type switching mode, power loss under a high frequency switching operation is still significant.

(3) Buck Converter

A buck converter, as shown in FIG. 7, is designed for use under a low voltage high current condition. This design biases the reduction of turn-on power loss at the switching element $S_1$ and the rectifier diode $D_1$, however it neglects switching loss, and no application example of this design has been disclosed. FIG. 8 shows another design of a buck converter, in which power MOSFET transistors $Q_1$ and $Q_2$ are used as substitutes for the switching element $S_1$ and the rectifier diode $D_1$. Because these two transistors $Q_1$ and $Q_2$ adopt complementary switching, the advantage of low impedance of these two transistors $Q_1$ and $Q_2$ is used to reduce turn-on loss. However, because these two transistors $Q_1$ and $Q_2$ require a hard switching mode, a high power loss during switching of the switching element is inevitable when used in a high voltage condition.

SUMMARY OF THE INVENTION

The present invention has been accomplished to provide an exchanging converter with a zero-voltage switching control function, which eliminates the aforesaid drawbacks. According to the present invention, the exchanging converter comprises a zero-voltage switching control circuit. The zero-voltage switching control circuit drives an output voltage filter capacitor to partially feed back storage energy to an input side thereof by means of the operation of a transformer (or storage inductor), and provides a complementary driving signal to switches in the exchanging converter when the switches reach a zero-voltage switching control condition, so as to control turn-off or turn-on time of the switches, enabling the switches and to repeat the switching operation at zero-voltage again and again.

DETAILED DESCRIPTION OF THE PREFERRED EMBODIMENTS

The present invention uses a zero-voltage switching control circuit $SK_1$ to control a power converter, enabling an output voltage filter capacitor to partially feed back storage energy to an input side thereof by means of the operation of a transformer (or storage inductor), and to provide a complementary driving signal to switches in the exchanging converter when the switches reach a zero-voltage switching control condition, so as to control turn-off or turn-on time of the switches, enabling the switches and to repeat the switching operation at zero-voltage again and again. The zero-voltage switching control circuit $SK_1$ regulates its pulse width by detecting the output voltage of the exchanging converter. The switches can be power MOSFETs having a respective rectifier diode.

Figure 1:
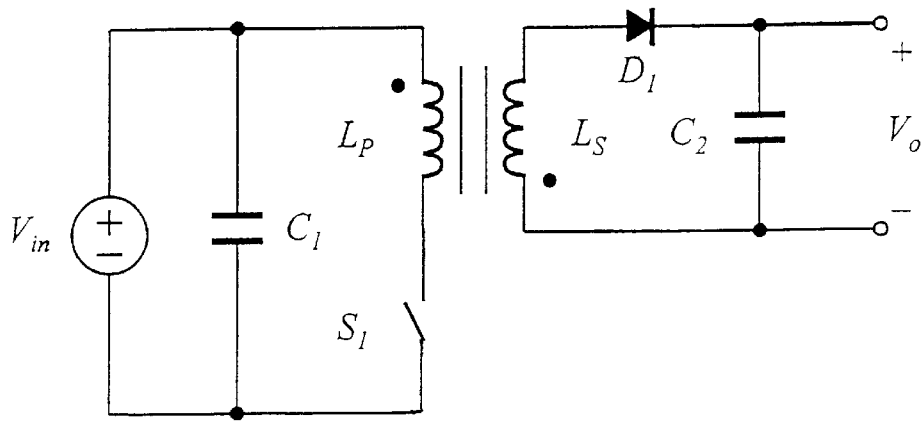
FIG. 1 illustrates the basic architecture of a conventional flyback converter.
Figure 2:
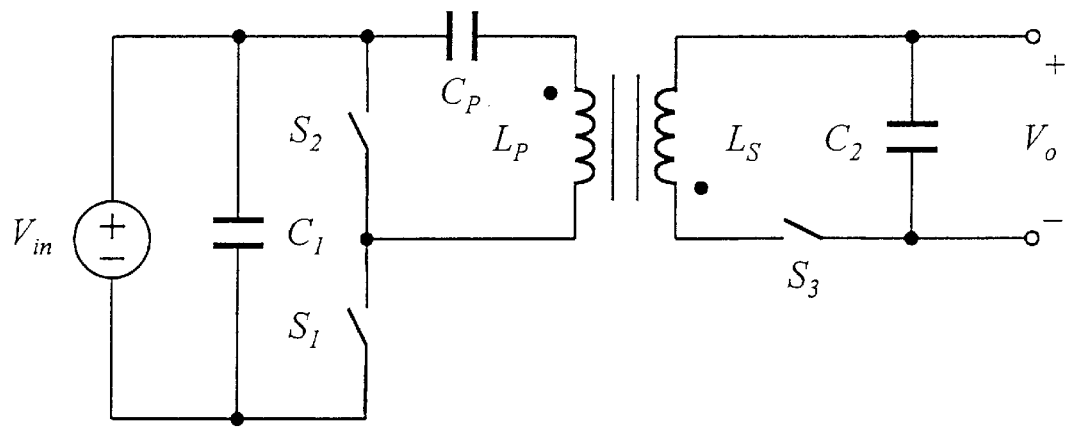
FIG. 2 illustrates the basic architecture of a flyback converter according to U.S. Pat. No. 5,057,986.
Figure 3:
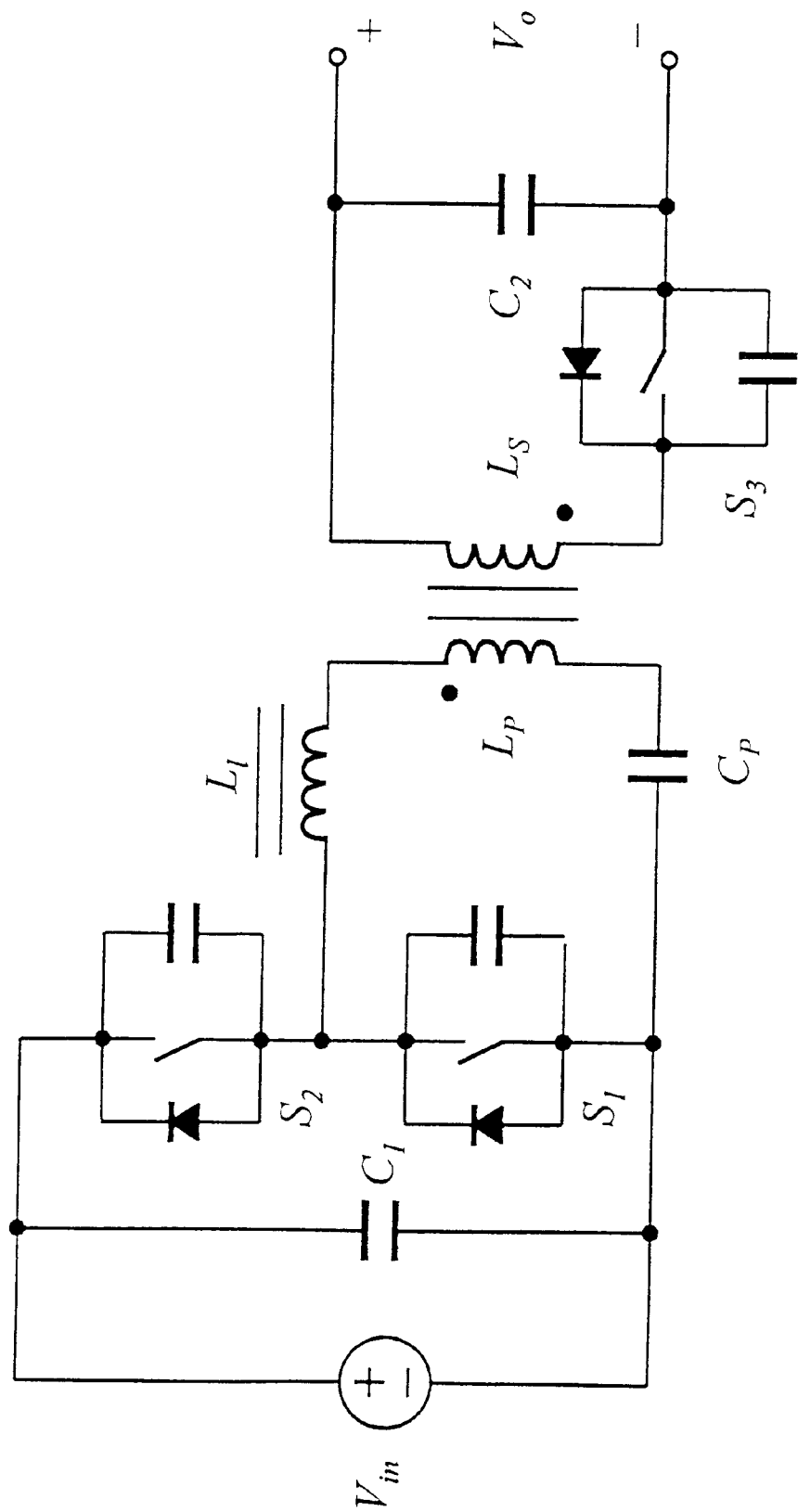
FIG. 3 illustrates the basic architecture of a flyback converter according to U.S. Pat. No. 5,402,329.
Figure 4:
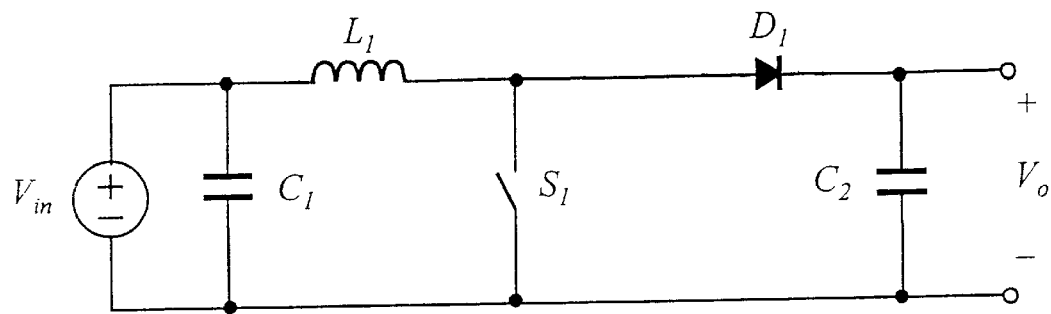
FIG. 4 illustrates the basic architecture of a conventional boost converter.
Figure 5:
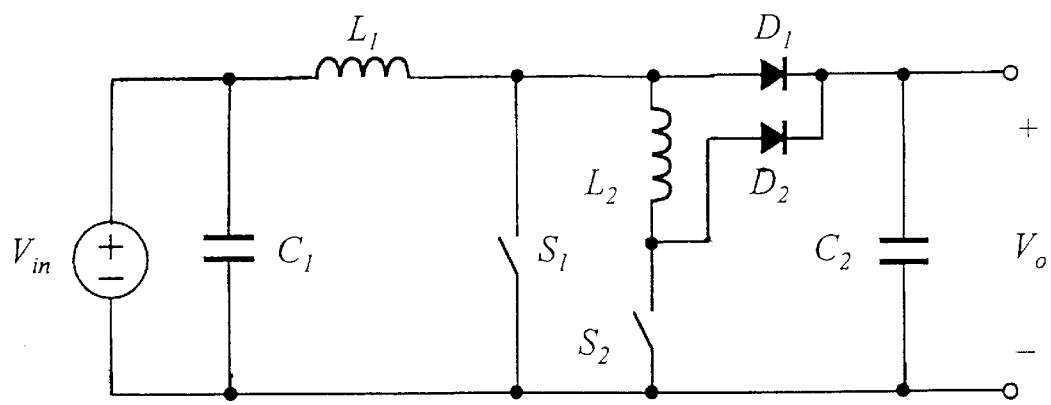
FIG. 5 illustrates the basic architecture of a switching type boost converter according to the prior art.
Figure 6:
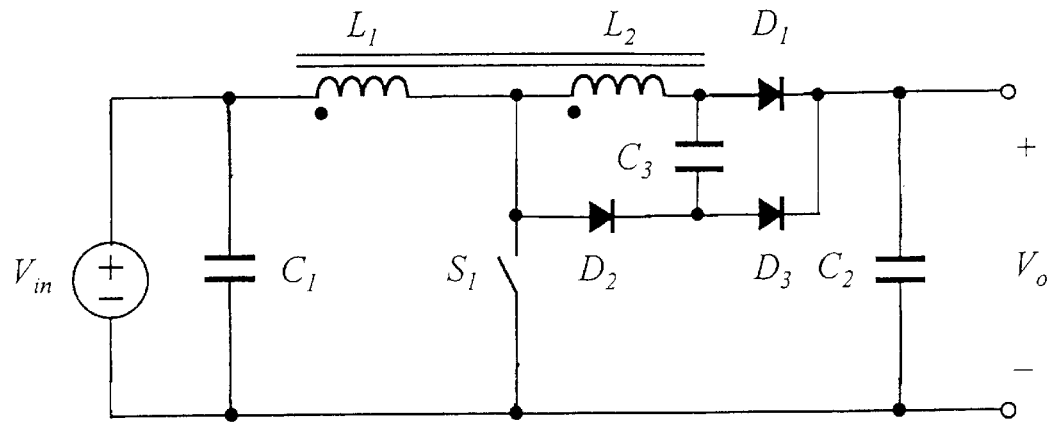
FIG. 6 illustrates the basic architecture of another switching type boost converter according to the prior art.
Figure 7:
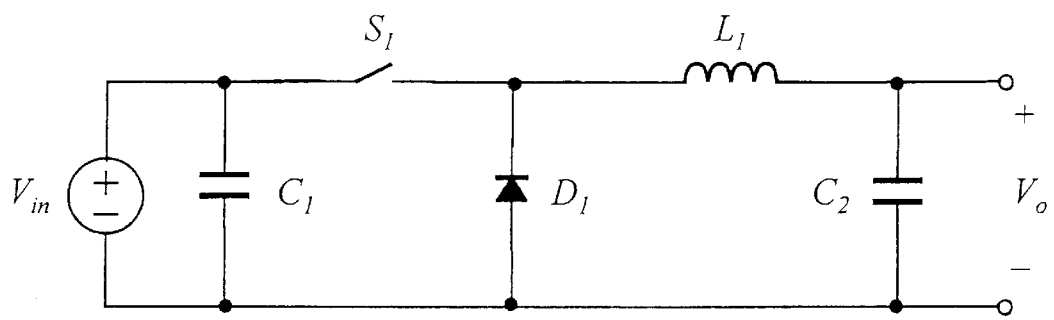
FIG. 7 illustrates the basic architecture of a conventional buck converter.
Figure 8:
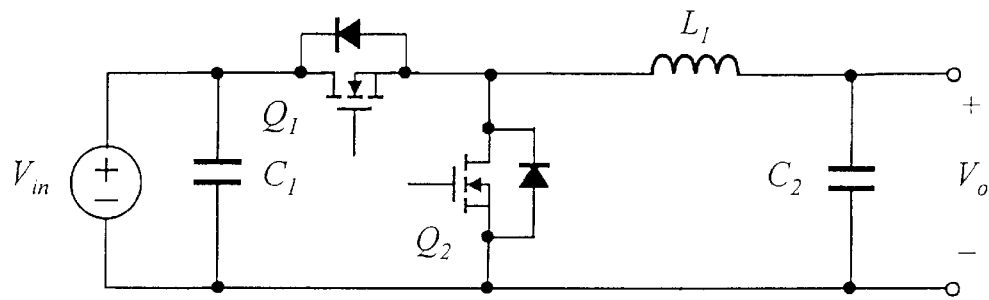
FIG. 8 illustrates the basic architecture of a low turn-on loss type buck converter according to the prior art.
Figure 9:
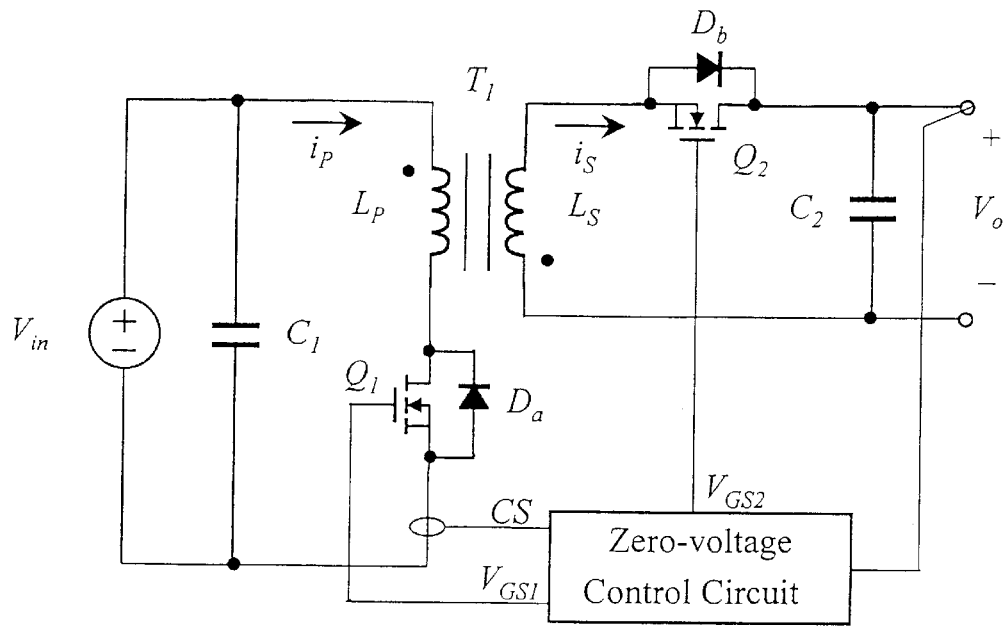
FIG. 9 illustrates the circuit architecture of an exchanging converter according to one embodiment of the present invention.

FIG. 9 shows a circuit design of the present invention used in a flyback converter. The circuit comprises an input voltage filter capacitor $C_1$ bridged the two opposite ends of input power source $V_{in}$ to provide a stable input voltage to a posterior converter. The posterior converter comprises a transformer $T_1$ for storing and releasing electric energy. The transformer $T_1$ comprises a primary winding $L_p$ and a secondary winding $L_s$. The inductance of the primary winding $L_p$ and the secondary winding $i_p$ are $i_s$, and the ratio of number of turns between the primary winding $L_p$ and the secondary winding $i_p$ is N:1. The primary winding $L_p$ is connected in series to a primary power switch $Q_1$, forming a series loop bridging the two opposite ends of the filter capacitor $C_1$. The secondary winding $L_s$ forms with a secondary power switch $Q_2$ a series loop bridging the two opposite ends of an output voltage filter capacitor $C_2$. The output voltage filter capacitor $C_2$ smooths the high frequency switching waveform modulated by the switches $Q_1$ and $Q_2$, so as to provide a stable DC output voltage $V_o$ to the load bridging the output ends.

Figure 10:
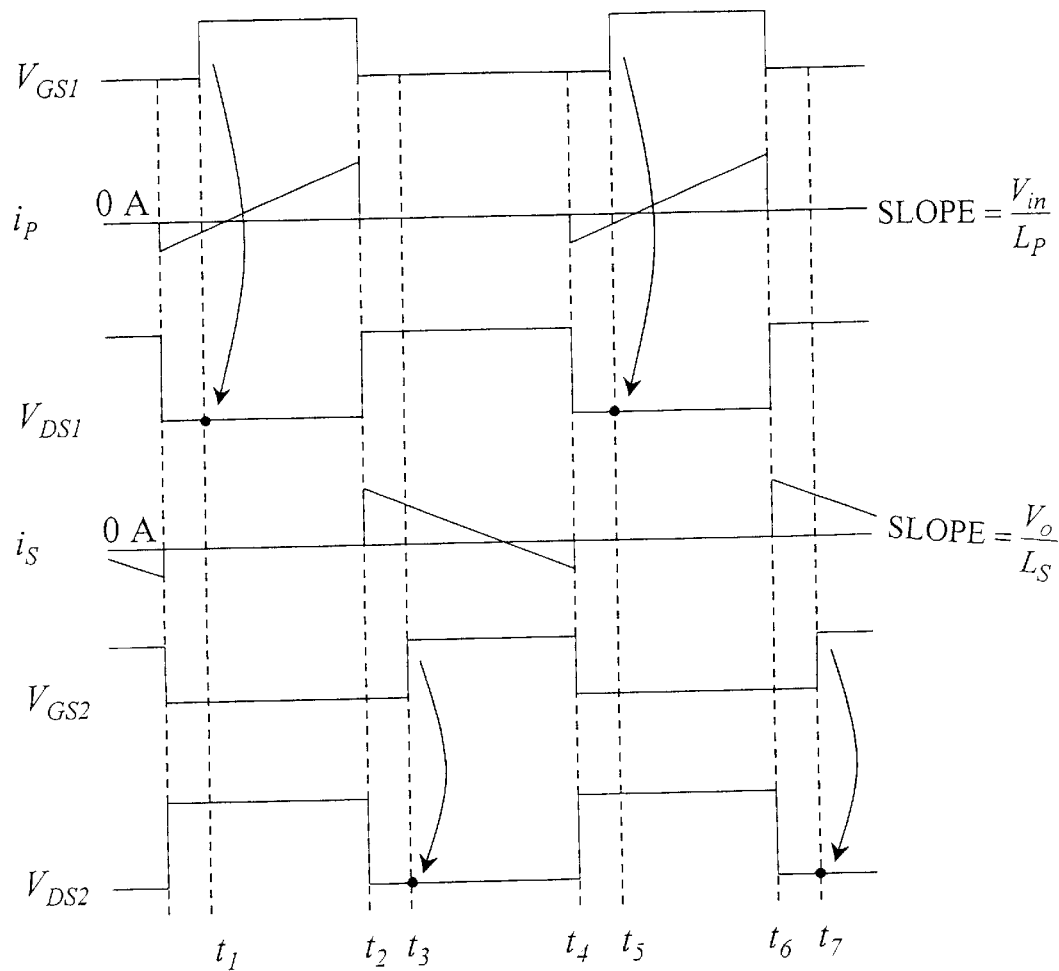
FIG. 10 illustrates voltage or current waveform of every major component part of the circuit shown in FIG. 9.

During operation, the voltage or current waveform of every major component part of the circuit is as shown in FIG. 10. As illustrated, when $t=t_1$, the control circuit $SK_1$ outputs a forward pulse wave driving voltage $V_{GS1}$ to the gate of the primary power switch $Q_1$, causing the primary power switch $Q_1$ to be turned on, and at this time, the input voltage $V_{in}$ is almost fully added to the primary winding $L_p$ if the impedance of the passage is neglected. Therefore, a charging current $i_p$ passes through the primary winding $L_p$, and the value of the charging current $i_p$ is subject to the following equation (1):

$$i_P(t) = i_P(t_1) + \frac{V_{in}}{L_P}(t - t_1) \qquad (1)$$

in which, $i_p(t_1)$ is the initial charging value; $V_{in}/L_p$ is the charging slope. At this stage, the voltage induced by the secondary winding $L_s$ is a reversed bias voltage to the rectifier diode $D_b$ of the secondary power switch $Q_2$, and the passage at the secondary power switch $Q_2$ is turned off, so that $i_s=0$.

When $t=t_2$, the control circuit $SK_1$ changes the forward pulse wave driving voltage $V_{GS1}$ to zero potential, causing the primary power switch $Q_1$ to be turned off, and at this time, the charging current $i_p$ is turned off, and the magnetic flux established by the charging current $i_p$ at the transformer $T_1$ starts to contract, causing the induced current $i_s$ to pass from the secondary winding $L_s$ to the diode $D_b$ to charge the filter capacitor $C_2$. The value of the induced current $i_s$, when the forward voltage drop of the diode $D_b$ is not considered, is subject to the following equation (2):

$$i_S(t) = i_P(t_2) \times N - \frac{V_o}{L_S}(t - t_2) \qquad (2)$$

in which, $i_p(t_2) \times N$ is the initial discharging value of the induced current $i_s$, and $-V_o/L_s$ is its discharging slope. In this embodiment, when the diode $D_b$ is turned on by the induced current $i_s$, the voltage $V_{GS2}$ between the drain and source of the secondary power switch $Q_2$ is approximately at the zero potential status, and this zero potential status is maintained unchanged until zero current at the diode $D_b$. Therefore, the period where the diode $D_b$ is maintained turned on is the time for the secondary power switch $Q_2$ to perform a zero-voltage switching operation, and $t_3$ can be any time spot in this period.

When $t=t_3$, the control circuit $SK_1$ outputs a forward pulse wave $V_{GS2}$ to the gate of the secondary power switch $Q_2$, causing the secondary power switch $Q_2$ to be turned on, and at this time, the passage impedance at the secondary power switch $Q_2$ is lower than the diode $D_b$, therefore current is mainly shunted from the diode $D_b$, to the passage at the secondary power switch $Q_2$, and when the energy is completely discharged from the secondary winding $L_s$, i.e. when $i_s=0$, the passage of the secondary power switch $Q_2$ is maintained turned on, and the voltage passes from the filter capacitor $C_2$ through the secondary power switch $Q_2$ to charge the secondary winding $L_s$ of the transformer $T_1$, causing the current value of the current $i_s$ to be changed to a negative value, although its charging slope is still maintained at $-V_o/L_s$.

When the secondary winding $L_s$ obtains a certain energy due to the charging operation of the capacitor $C_2$, i.e., when $t=t_4$, the control circuit $SK_1$ changes the driving voltage $V_{GS1}$ to zero potential, causing the secondary power switch $Q_2$ to be turned off, and at this time, the current $i_s$ is turned off, and the magnetic flux established by the current $i_s$ at the transformer $T_1$ starts to contract, causing the induced current $i_p$ to pass from the primary winding $L_p$ to the diode $D_a$ and to charge the filter capacitor $C_1$. The value of the current $i_p$, when the forward voltage drop of the diode $D_a$ is not considered, is subject to the following equation (3):

$$i_P(t) = \frac{i_S(t_4)}{N} + \frac{V_{in}}{L_p}(t-t_4) \qquad (3)$$

in which, $i_s(t_4)/N$ is the initial discharging value and ; $V_{in}/L_p$ is the charging slope. In this embodiment, when the diode $D_a$ is turned on, the voltage $V_{DS1}$ between the drain and source of the primary power switch $Q_1$ is approximately at the zero potential status, and this zero potential status is maintained unchanged until zero current at the diode $D_a$. Therefore, the period where the diode $D_a$ is maintained turned on is the time for the primary power switch $Q_1$ to perform a zero-voltage switching operation, and $t_5$ can be any time spot in this period.

When $t=t_5$, the control circuit $SK_1$ outputs a forward pulse wave $V_{GS1}$ to the gate of the primary power switch $Q_1$, causing the primary power switch $Q_1$ to be turned on, and at this time, the passage impedance at the primary power switch $Q_1$ is lower than at the diode $D_a$, causing current to be mainly shunted from the body diode $D_a$, to the passage at the primary power switch $Q_1$, and when the energy is completely discharged from the primary winding $L_p$, i.e. when $i_p=0$, the passage of the primary power switch $Q_1$ is maintained turned on, and the voltage passes from the filter capacitor $C_1$ through the primary power switch $Q_1$ to charge the primary winding $L_p$ of the transformer $T_1$, so as to store energy in the transformer $T_1$, and at this stage, the slope of the charging current $i_p$ is still maintained at $V_{in}/L_p$. Therefore, by means of controlling the output time sequence of the output pulse wave $V_{GS2}$ and the output pulse wave $V_{GS1}$, the control circuit $SK_1$ drives the switches $Q_1$ and $Q_2$ to be repeatedly turned on at zero-voltage again and again to effectively reduce the switches $Q_1$ and $Q_2$ from power loss during a high frequency switching operation.

Figure 11:
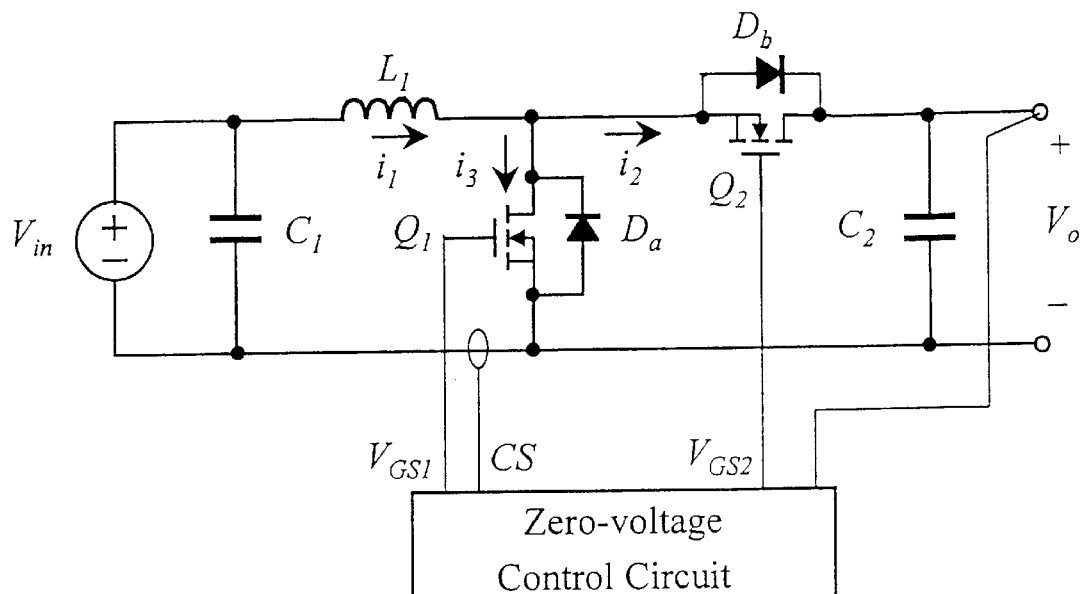
FIG. 11 illustrates the circuit architecture of an exchanging converter according to an alternate form of the present invention.

FIG. 11 shows a circuit design of the present invention used in a boost converter. The circuit comprises an input voltage filter capacitor $C_1$ bridging the two opposite ends of input power source $V_{in}$, a storage inductor $L_1$ and a charging power switch $Q_1$ connected in series and bridging the two opposite ends of the filter capacitor $C_1$, and a discharging power switch $Q_2$ connected in series to the charging power switch $Q_1$ and forming with the charging power switch $Q_1$ a series loop bridging the two opposite ends of an output voltage filter capacitor $C_2$. The drain of the charging power switch $Q_1$ is connected to the source of the discharging power switch $Q_2$, and its source is connected to the negative terminal of the capacitor $C_2$, so that the filter capacitor $C_2$ is capable of providing a stable DC output voltage $V_o$ to the load at its output end.

Figure 12:
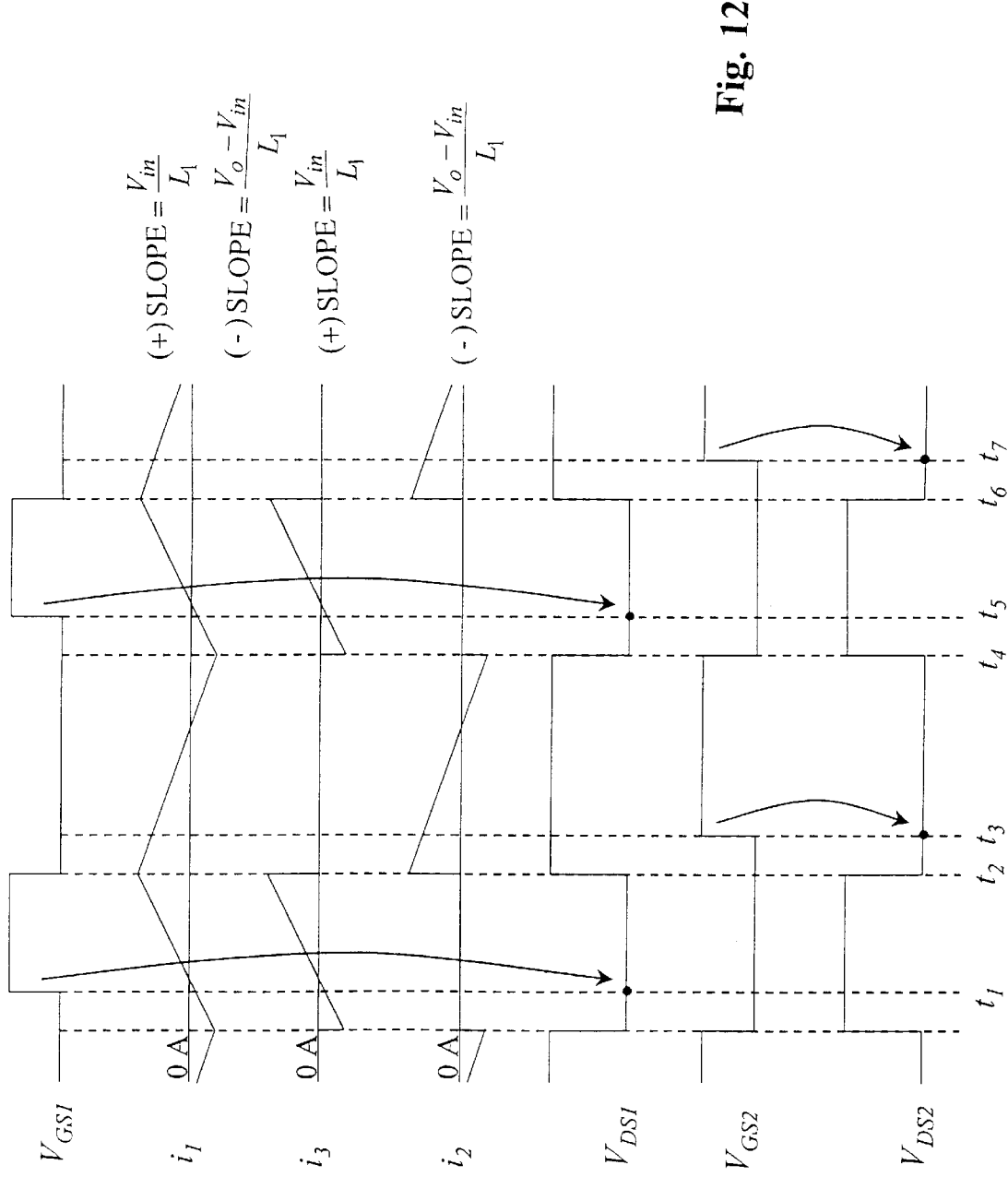
FIG. 12 illustrates voltage or current waveform of every major component part of the circuit shown in FIG. 11.

During operation, the voltage or current waveform of every major component part of the circuit of FIG. 11 is shown in FIG. 12. As illustrated, when $t=t_1$, the control circuit $SK_1$ outputs a forward pulse wave driving voltage $V_{GS1}$ to the gate of the power switch $Q_1$, causing the power switch $Q_1$ to be turned on, and at this time, the passage of the power switch $Q_2$ is off, and the input voltage $V_{in}$ is almost fully added to the storage inductor $L_1$. Therefore a charging current $i_1$ passes through the storage inductor $L_1$, and the value of the charging current $i_1$ is subject to the following equation (4):

$$i_1(t) = i_1(t_1) + \frac{V_{in}}{L_1}(t-t_1) \qquad (4)$$

in which, $i_1(t_1)$ is the initial charging value and; $V_{in}/L_1$ is the charging slope. At this stage, the input voltage $V_{in}$ is lower than the output voltage $V_o$, the voltage across the diode $D_b$ of the power switch $Q_2$ is a reverse bias voltage, and the passage of the power switch $Q_1$ is turned off. Therefore, $i_1=i_3$, and $i_2=0$.

When $t=t_2$, the control circuit $SK_1$ changes the forward pulse wave driving voltage $V_{GS1}$ to zero potential, causing the power switch $Q_1$ to be turned off. At this time, the induction current $i_1$ must be maintained in continuation, and the passage of the power switch $Q_2$ is maintained off, the direction of the diode $D_b$ provides a path for the induction current $i_1$ to charge the filter capacitor $C_2$, and voltage at the storage inductor $L_1$, if the forward voltage drop of the diode $D_b$ is not considered, is equal to $(V_o-V_{in})$ when the diode $D_b$ is turned on, and the value of the induced current $i_s$ is subject to the following equation (5):

$$i_1(t) = i_1(t_2) - \frac{V_o - V_{in}}{L_1}(t-t_2) \qquad (5)$$

in which, $i_1(t_2)$ is the initial discharging value of the induced current $i_1$, and $-(V_o-V_{in})/L_1$ is its discharging slope. In this embodiment, when the body diode $D_b$ is turned on by the induced current $i_1$, the voltage $V_{GS2}$ between the drain and source of the power switch $Q_2$ is approximately at the zero potential status, and this zero potential status is maintained unchanged until zero current is reached at the diode $D_b$. Therefore, the period where the rectifier diode $D_b$ is maintained turned on is the time for the power switch $Q_2$ to perform a zero-voltage switching operation, and $t_3$ can be any time spot in this period.

When $t=t_3$, the control circuit $SK_1$ outputs a forward pulse wave $V_{GS2}$ to the gate of the secondary power switch $Q_2$, causing the power switch $Q_2$ to be turned on, and at this time, the passage impedance at the secondary power switch $Q_2$ is lower than the body diode $D_b$, therefore current is mainly shunted from that of diode $D_b$. Therefore, to the passage at the power switch $Q_2$, and when the energy is completely discharged from the storage inductor $L_1$, i.e. when $i_1=0$, the passage of the power switch $Q_2$ is maintained turned on, and the voltage passes from the filter capacitor $C_2$ through the power switch $Q_2$ to charge the storage inductor $L_1$ and the capacitor $C_1$, causing the current value of the current $i_s$ to be changed to a negative value, even though its charging slope is still maintained at $-(V_o-V_{in})/L_1$.

When the storage inductor $L_1$ obtains certain energy due to charging operation of the capacitor $C_2$, i.e., when $t=t_4$, the control circuit $SK_1$ changes the driving voltage $V_{GS2}$ to zero potential, causing the power switch $Q_2$ to be turned off, and at this time, the current $i_1$ is maintained in continuation, and the current $i_1$ passes from the storage inductor $L_1$ to the diode $D_a$ and to charge the filter capacitor $C_1$. The value of the current $i_1$, when the forward voltage drop of the diode $D_a$ is not considered, is subject to the following equation (6):

$$i_1(t) = i_1(t_4) + \frac{V_{in}}{L_1}(t-t_4) \qquad (6)$$

in which, $i_1(t_4)$ is the initial discharging value of the $i_1$; and $V_{in}/L_1$ is the charging slope. In this embodiment, when diode $D_a$ is turned on by the current $i_1$, the voltage $V_{DS1}$ between the drain and source of the power switch $Q_1$ is approximately at the zero potential status, and this zero potential status is maintained unchanged until zero current at diode $D_a$. Therefore, the period where diode $D_a$ is maintained turned on is the time for the primary power switch $Q_1$ to perform a zero-voltage switching operation, and $t_5$ can be any time spot in this period.

When $t=t_3$, the control circuit $SK_1$ outputs a forward pulse wave $V_{GS1}$ to the gate of the power switch $Q_1$, causing the power switch $Q_1$ to be turned on, and at this time, the passage impedance at the power switch $Q_1$ is lower than that of the body diode D. Therefore, current is mainly shunted from the diode $D_a$, to the passage at the power switch $Q_1$, and when the energy is completely discharged from the storage inductor $L_1$, i.e. when $i_1=0$, the passage of the power switch $Q_1$ is maintained turned on, causing the voltage to pass from the filter capacitor $C_1$ through the power switch $Q_1$ to charge the storage inductor $L_1$, and the slope is still maintained at $V_{in}/L_1$. Therefore, by means of controlling the output time sequence of the output pulse wave $V_{GS2}$ and the output pulse wave $V_{GS1}$, the control circuit $SK_1$ drives the switches $Q_1$ and $Q_2$ to be repeatedly turned on at zero-voltage again and again to effectively protect the switches $Q_1$ and $Q_2$ from power loss during a high frequency switching operation.

Figure 13:
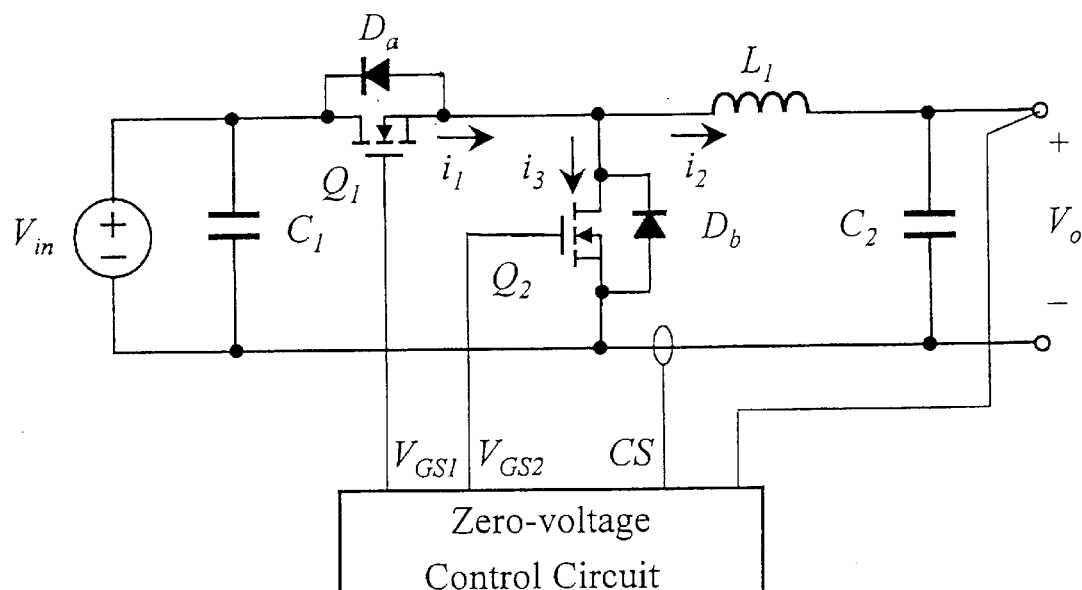
FIG. 13 illustrates the circuit architecture of an exchanging converter according to another alternate form of the present invention.

FIG. 13 shows a circuit design of the present invention used in a buck converter. The circuit comprises an input voltage filter capacitor $C_1$ bridging the two opposite ends of input power source $V_{in}$, a charging power switch $Q_1$ and a discharging power switch $Q_2$ connected in series and bridging the two opposite ends of the filter capacitor $C_1$, a storage inductor $L_1$ forming with the discharging power switch $Q_2$ a series loop bridging the two opposite ends of an output voltage filter capacitor $C_2$. The storage inductor $L_1$ and filter capacitor $C_1$ form a low-pass filter to smooth the high frequency waveform outputted from the switches $Q_1$ and $Q_2$, so as to provide a stable DC output voltage $V_o$ to the load at its output end.

Figure 14:
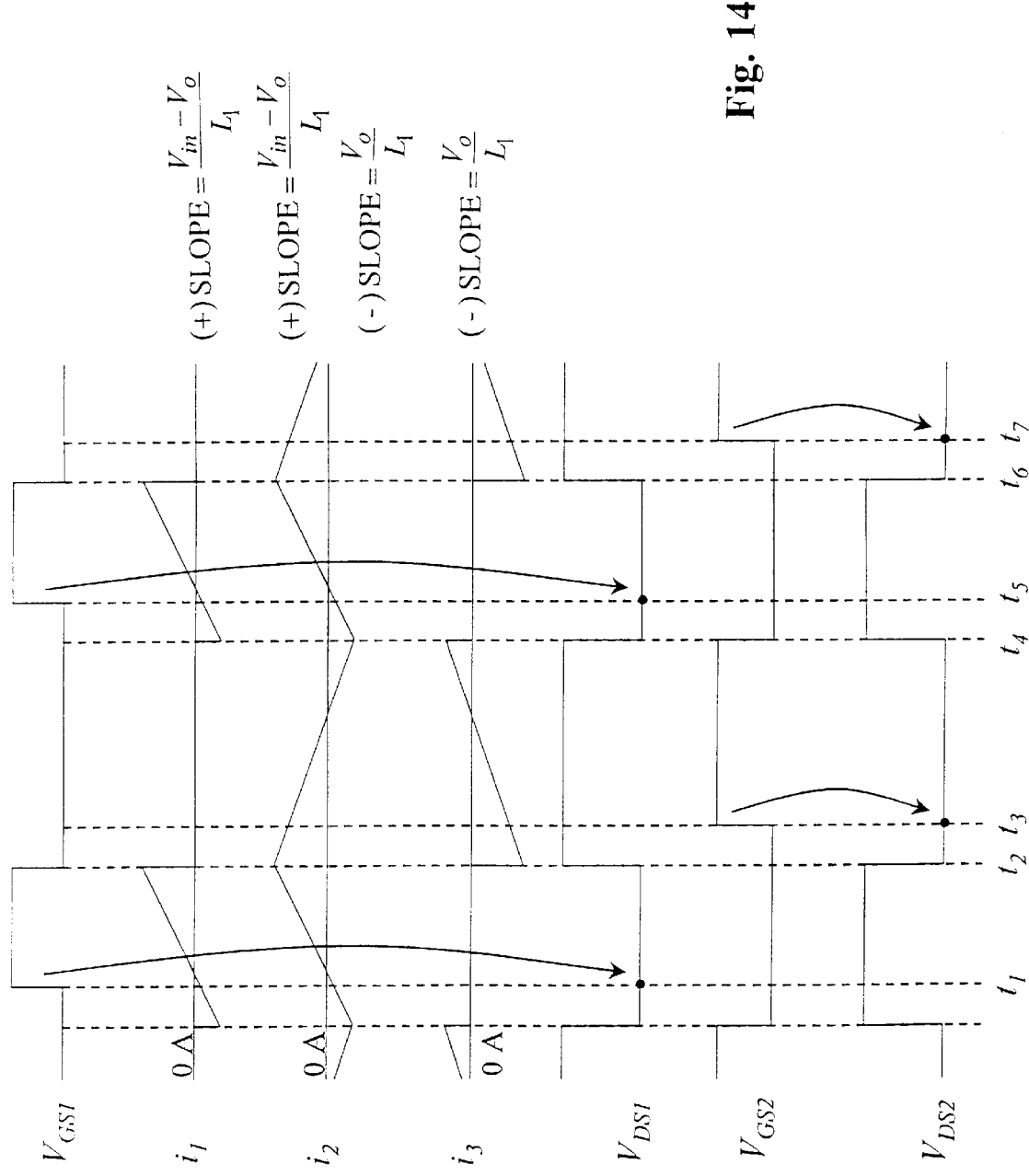
FIG. 14 illustrates voltage or current waveform of every major component part of the circuit shown in FIG. 13.

During operation, the voltage or current waveform of every major component part of the circuit of FIG. 13 is shown in FIG. 14. As illustrated, when $t=t_1$, the control circuit $SK_1$ outputs a forward pulse wave driving voltage $V_{GS1}$ to the gate of the power switch $Q_1$, causing the power switch $Q_1$ to be turned on, and at this time, the passage of the power switch $Q_2$ is off, and the input voltage $V_{in}$ is greater than the output voltage $V_{in}$. Therefore, a voltage drop $-(V_{in}-V_o)$ exists in the storage inductor $L_1$, which voltage drop forms a charging current $i_2$ at the storage inductor $L_1$, and the value of the charging current $i_1$ is subject to the following equation (7):

$$i_2(t) = i_2(t_1) + \frac{V_{in}-V_o}{L_1}(t-t_1) \qquad (7)$$

in which, $i_2(t_1)$ is the initial charging value and; $(V_{in}-V_o)/L_1$ is the charging slope. At this stage, current $i_1=i_2$, and $i_3=0$.

When $t=t_2$, the control circuit $SK_1$ changes the forward pulse wave driving voltage $V_{GS1}$ to zero potential, causing the power switch $Q_1$ to be turned off. At this time, the induction current $i_2$ must be maintained in continuation, and the passage of the power switch $Q_2$ is maintained off. The direction of the body diode $D_b$ provides a path for the induction current $i_2$ to charge the filter capacitor $C_2$, and the voltage at the storage inductor $L_1$, if the forward voltage drop of the diode $D_b$ is not considered, is equal to $V_o$ when the body diode $D_b$ is turned on, and the value of the induced current $i_2$ is subject to the following equation (8):

$$i_2(t) = i_2(t_2) - \frac{V_o}{L_1}(t-t_2) \qquad (8)$$

in which, $i_2$ and $(t_2)$ is the initial discharging value of the current $i_2$, $-V_{oo}/L_1$ is its discharging slope. In this embodiment, when the diode $D_b$ is turned on by the current $i_2$, the voltage $V_{GS2}$ between the drain and source of the power switch $Q_2$ is approximately at the zero potential status, and this zero potential status is maintained unchanged until zero current at the diode $D_b$. Therefore, the period where the body diode $D_b$ is maintained turned on is the time for the power switch $Q_2$ to perform a zero-voltage switching operation, and $t_3$ can be any time spot in this period.

When $t=t_3$, the control circuit $SK_1$ outputs a forward pulse wave $V_{GS1}$ to the gate of the power switch $Q_2$, causing the power switch $Q_2$ to be turned on, and at this time, the passage impedance at the power switch $Q_2$ is lower than at the diode $b_a$. Therefore, current is mainly shunted from the body diode $D_b$, to the passage at the power switch $Q_2$, and when the energy is completely discharged from the storage inductor $L_1$, i.e. when $i_2=0$, the passage of the power switch $Q_2$ is maintained turned on, causing the voltage to pass from the filter capacitor $C_2$ through the power switch $Q_2$ to charge the storage inductor $L_1$, causing the current $i_2$ to be changed to negative status, and the slope to still be maintained at $-V_o/L_1$.

When the storage inductor $L_1$ obtains certain energy due to charging operation of the capacitor $C_1$, i.e., when $t=t_4$, the control circuit $SK_1$ changes the driving voltage $V_{GS2}$ to zero potential, causing the power switch $Q_2$ to be turned off, and at this time, the current $i_2$ is maintained in continuation, and the current $i_2$ passes from the storage inductor $L_1$ to the diode $D_a$ and to charge the filter capacitor $C_1$. The value of the current $i_2$, when the forward voltage drop of the diode $D_a$ is not considered, is subject to the following equation (9):

$$i_2(t) = i_2(t_4) + \frac{V_{in}-V_o}{L_1}(t-t_4) \qquad (9)$$

in which, $i_2(t_4)$ is the initial discharging value of the inductance and, $-(V_{in}-V_o)/L_1$ is its discharging slope. In this embodiment, when the body diode $a_b$ is turned on by the current $i_2$, the voltage $V_{DS1}$ between the drain and source of the power switch $Q_1$ is approximately at the zero potential status, and this zero potential status is maintained unchanged until zero current at the body diode $D_a$ is reached. Therefore, the period where the diode $D_a$ is maintained turned on is the time for the power switch $Q_1$ to perform a zero-voltage switching operation, and $t_3$ can be any time spot in this period.

When $t=t_3$, the control circuit $SK_1$ outputs a forward pulse wave $V_{GS1}$ to the gate of the power switch $Q_1$, causing the power switch $Q_1$ to be turned on, and at this time, the passage impedance at the power switch $Q_1$ is lower than at the diode $D_a$. Therefore current is mainly shunted from the body diode $D_a$, to the passage at the power switch $Q_1$, and when the energy is completely discharged from the storage inductor $L_1$, i.e. when $i_2=0$, the passage of the power switch $Q_1$ is maintained turned on, causing the voltage to pass from the filter capacitor $C_1$ through the power switch $Q_1$ to charge the storage inductor $L_1$, and the capacitor $C_2$, and the slope to still be maintained at $(V_{in}-V_o)/L_1$.

Thus, by means of controlling the output time sequence of the output pulse wave $V_{GS1}$ and the output pulse wave $V_{GS2}$, the control circuit $SK_1$ drives the switches $Q_1$ and $Q_2$ to be repeatedly turned on at zero-voltage again and again to effectively protect the switches $Q_1$ and $Q_2$ from power loss during a high frequency switching operation.

Further, the control circuit $SK_1$ can be designed to operate at a rated or frequency converting mode. When at the rated mode, the inductance of the transformer (or storage capacitor) must be sufficient to satisfy the requirement for zero-voltage control within the range of full load, so that the power switches $Q_1$ and $Q_2$ can be turned on at any time under zero-voltage. Therefore, the switching frequency will be lower when the load becomes greater, and vice versa.

In conclusion, the present invention uses a control circuit $SK_1$ having a zero-voltage control function to drive the power switch means of a flyback converter, boost converter or buck converter to achieve a switching operation under zero-voltage, so that power loss due to a high frequency operation is eliminated. Because the design greatly reduces accumulated heat at the switch means, the size of the heat sink can be greatly reduced. Therefore, the present invention is practical for use in all electronic products of small design.

It is to be understood that the drawings are designed for purposes of illustration only, and are not intended for use as a definition of the limits and scope of the invention disclosed.

What the invention claimed is:

1. An exchanging converter comprising:
   an input voltage filter capacitor bridging two opposite ends of an input power source to provide a stable input voltage;
   a transformer for storing and releasing electric energy, said transformer comprising a primary winding and a secondary winding;
   a primary power switch forming with said primary winding a series loop that bridges two opposite ends of said input voltage filter capacitor;
   an output voltage filter capacitor;
   a secondary power switch forming with said secondary winding a series loop that bridges two opposite ends of said output voltage filter capacitor for enabling said output voltage filter capacitor to smooth a high frequency switching waveform from said primary and secondary power switches, and to provide a stable DC output voltage to a load that also bridges said two opposite terminals of the output voltage filter capacitor; and
   a zero-voltage switching control circuit for driving said output voltage filter capacitor to partially feed back storage energy to an input side of said transformer, and for respectively providing a complementary driving signal to said primary power switch and said secondary power switch to control a turn-off time of said primary power switch and said secondary power switch when said primary power switch and said secondary power switch reach a zero-voltage switching control condition, so as to drive said primary power switch and said secondary power switch to repeat the switching operation at zero-voltage again and again.

2. The exchanging converter of claim 1 wherein said zero-voltage switching control circuit regulates a pulse width of said high frequency switching waveform by detecting said stable DC output voltage.

3. The exchanging converter of claim 1 or 2 wherein said primary power switch and said secondary power switch are power MOSFETs, each comprising a rectifier diode.

4. The exchanging converter of claim 3 wherein said primary power switch has a drain connected to said primary winding and a source connected to a negative end of said input voltage filter capacitor; said secondary power switch has a drain connected to a positive end of said output voltage filter capacitor and a source connected to said secondary winding; and said zero-voltage switching control circuit provides said complementary driving signal to the drains of said primary power switch and said secondary power switch.

5. An exchanging converter comprising:
   an input voltage filter capacitor bridging two opposite ends of an input power source to provide a stable input voltage;
   a charging power switch;
   a storage inductor forming with said charging power switch a series loop that bridges two opposite ends of said output voltage filter capacitor;
   an output voltage filter capacitor;
   a discharging power switch forming with said charging power switch a series loop that bridges two opposite ends of said output voltage filter capacitor for enabling said output voltage filter capacitor to provide a stable DC output voltage to a load that also bridges said two opposite terminals of the output voltage filter capacitor; and
   a zero-voltage switching control circuit for driving said output voltage filter capacitor to partially feed back storage energy to an input side of said storage inductor, and for respectively providing a complementary driving signal to said charging power switch and said discharging power switch to control a turn-off time of said charging power switch and said discharging power switch when said charging power switch and said discharging power switch reach a zero-voltage switching control condition, so as to drive said charging power switch and said discharging power switch to repeat the switching operation at zero-voltage again and again.

6. The exchanging converter of claim 5 wherein said zero-voltage switching control circuit regulates a pulse width of a switching waveform by detecting said stable DC output voltage.

7. The exchanging converter of claim 5 or 6 wherein said primary power switch and said secondary power switch are power MOSFETs, each comprising a rectifier diode.

8. The exchanging converter of claim 7 wherein said charging power switch has a drain connected to said storage inductor and a source connected to a negative end of said input voltage filter capacitor; said discharging power switch has a drain connected to a positive end of said output voltage filter capacitor and a source connected to said storage inductor; and said zero-voltage switching control circuit provides said complementary driving signal to the drains of said charging power switch and said discharging power switch.

9. An exchanging converter comprising:
   an input voltage filter capacitor bridging two opposite ends of an input power source to provide a stable input voltage;
   a charging power switch;
   a discharging power switch forming with said charging power switch a series loop that bridges two opposite ends of said output voltage filter capacitor for enabling said output voltage filter capacitor to provide a stable DC output voltage to a load that also bridges said two opposite terminals of said output voltage filter capacitor;
   an output voltage filter capacitor;
   a storage inductor, said storage inductor forming with said discharging power switch a series loop that bridges two opposite ends of said output voltage filter capacitor, and forming with said output voltage filter capacitor a low-pass filter for providing a stable DC output voltage to a load bridging two opposite terminals of an output end of said output voltage filter capacitor; and
   a zero-voltage switching control circuit for driving said output voltage filter capacitor to partially feed back storage energy to an input side of said storage inductor, and for respectively providing a complementary driving signal to said charging power switch and said discharging power switch to control a turn-off time of said charging power switch and said discharging power switch when said charging power switch and said discharging power switch reach a zero-voltage switching control condition, so as to drive said charging power switch and said discharging power switch to repeat the switching operation at zero-voltage again and again.

10. The exchanging converter of claim 9 wherein said zero-voltage switching control circuit regulates a pulse width of a switching waveform by detecting said stable DC output voltage.

11. The exchanging converter of claim 9 or 10 wherein said primary power switch and said secondary power switch are power MOSFETs, each comprising a rectifier diode.

12. The exchanging converter of claim 11 wherein said charging power switch has a drain connected to said storage inductor and a source connected to a negative end of said input voltage filter capacitor; said discharging power switch has a drain connected to a positive end of said output voltage filter capacitor and a source connected to said storage inductor; and said zero-voltage switching control circuit provides said complementary driving signal to the drains of said charging power switch and said discharging power switch.

* * * * *